US005400940A

United States Patent [19]

Sato et al.

[11] Patent Number: 5,400,940

[45] Date of Patent: Mar. 28, 1995

[54] PAPER WEB THREADING APPARATUS FOR ROTARY PRINTING PRESS

[75] Inventors: Masayoshi Sato; Kunio Suzuki, both of Kanagawa; Yukoh Tomita, Tokyo, all of Japan

[73] Assignee: Kabushiki Kaisha Tokyo Kikai Seisakusho, Tokyo, Japan

[21] Appl. No.: 57,416

[22] Filed: May 6, 1993

Related U.S. Application Data

[63] Continuation of Ser. No. 859,246, Mar. 26, 1992, abandoned, which is a continuation of Ser. No. 728,305, Jul. 8, 1991, abandoned, which is a continuation of Ser. No. 502,882, Apr. 2, 1990, abandoned.

[30] Foreign Application Priority Data

Apr. 4, 1989 [JP] Japan .................................... 1-84012

[51] Int. Cl.[6] .................................................. G03B 1/56

[52] U.S. Cl. ........................................ 226/92; 101/228

[58] Field of Search ....................... 226/4, 91, 92, 110; 101/228

[56] References Cited

U.S. PATENT DOCUMENTS

| | | | |
|---|---|---|---|
| 2,862,705 | 12/1958 | Faeber | 226/92 |
| 3,127,079 | 3/1964 | Allander | 226/92 |
| 3,823,887 | 7/1974 | Gerstein | 242/56.2 |
| 3,995,553 | 12/1976 | Winterholler et al. | 101/228 |
| 4,111,122 | 9/1978 | Kutzner et al. | 226/92 |
| 4,706,862 | 11/1987 | Thielacher | 226/92 |
| 4,924,776 | 5/1990 | Cunningham et al. | 226/92 X |
| 4,924,966 | 5/1990 | Cunningham et al. | 226/92 |
| 4,929,976 | 5/1990 | Cunningham et al. | 226/92 X |
| 4,987,830 | 1/1991 | Fukuda et al. | 226/92 |

FOREIGN PATENT DOCUMENTS

| | | |
|---|---|---|
| 48-36325 | 11/1973 | Japan . |
| 57-1153 | 1/1982 | Japan . |

*Primary Examiner*—Daniel P. Stodola
*Assistant Examiner*—Eileen A. Dunn
*Attorney, Agent, or Firm*—Armstrong, Westerman, Hattori, McLeland & Naughton

[57] ABSTRACT

A paper web threading apparatus for a rotary printing press, which occupies a minimum space required for the installation thereof and which enables automatic threading of a paper web to be conducted smoothly without applying any ineffective tension to the paper web which can be guided along all relevant paper web threading paths. The paper web threading apparatus includes a guide path provided along and laterally of the paper web threading path. A paper web guiding member includes a belt-shaped member having a guided end engaging portion adapted to engage with or secure the guided end of the paper web. A guiding member moving and driving device meshs with the paper we guiding member so as to move the latter along the guide path.

4 Claims, 7 Drawing Sheets

PAPER WEB THREADING APPARATUS FOR ROTARY PRINTING PRESS

This application is a continuation of application Ser. No. 07/859,246, filed Mar. 26, 1992, now abandoned, which is a continuation of application Ser. No. 07/728,305, filed Jul. 8, 1991, now abandoned, which is a continuation of application Ser. No. 07/502,882, filed Apr. 2, 1990, now abandoned.

BACKGROUND OF THE INVENTION

1. Field of the Invention

This invention relates to a paper web threading apparatus for a rotary printing press for threading a paper web through a paper web threading path extending from a paper web supply section through a printing section to a folding section to thereby conduct printing of the paper web, and more particularly to a paper web threading apparatus for effective use in a printing press having a paper web threading path which extends from a paper web supply section through a plurality of guide rollers and turning bars including a double ender device and a bay window device to a folding section, the arrangement being made such that the threading of a paper web is conducted by a paper web guiding member adapted to be moved on and along a guide path provided along the paper web threading path.

2. Description of the Prior Art

The above-mentioned paper web threading apparatus is publicly known from the art disclosed in U.S. Pat. No. 3,127,079 (which will be referred to as "Prior Art I" hereinbelow), the art disclosed in Japanese Patent No. SHO 48-36325 (which will be referred to as "Prior Art II hereinbelow), the art disclosed in U.S. Pat. No. 3,995,553 (which will be referred to as "Prior Art III" hereinbelow), and the art disclosed in Japanese Laid-Open Patent Application No. SHO 57-1153 (which will be referred to as "Prior Art IV" hereinbelow).

These prior arts I, II, III and IV show paper web threading apparatuses each comprising a guide path provided along a paper web threading path, and a paper web guiding member adapted to be moved on and along the guide path. The prior art I provides a configuration wherein the paper web guiding member is a flat, flexible and elastic belt piece, and the belt is held or sandwiched between a plurality of pairs of pressing rollers and drive rollers provided at upper and lower positions along the guide path, the arrangement being made such that when the drive rollers are rotatively driven the belt is moved on and along the guide path. Further, the prior art II provides a configuration wherein the paper web guiding member is a guide wheel provided with a toothed drive wheel and a driver means, and the guide path is a toothed rail adapted to mesh with the toothed drive wheel, the arrangement being made such that when the toothed drive wheel is rotatively driven by the driver means the guide wheel is self-propelled on the toothed rail. Still further, the prior art III provides a configuration wherein the paper web guiding member is a chain having a predetermined length which mesh with a plurality of sprocket wheels provided along a guide path, the arrangement being made such that when the sprocket wheels are rotatively driven the above-mentioned chain is constantly moved along the guide path. Further, an air motor is used to drive the sprocket wheels, and a sensor (in particular, air sensor) is provided in the vicinity of the sprocket wheels mounted on a guide path to detect the start and stopping of the air motor and also detect the arrival of the ends of the chain. Yet further, the prior art IV provides a configuration wherein the paper web guiding member is a flexible member having a cross-sectional shape so as to provide substantially the same magnitude of resistance to flexure in every direction, such as, for example, a rope or winding having a circular or polygonal section, and the flexible member is held or sandwiched between a plurality of friction wheel groups provided at upper and lower positions along a guide path, at least one of the friction wheels in each group being used as a drive friction wheel, the arrangement being made such that when the drive friction wheels are rotatively driven the flexible member is moved on and along the guide path.

The above-mentioned prior arts have the following problems, respectively.

In the first place, the prior art I was disadvantageous in that since the paper web guiding member is a flat piece of belt, a slip tends to occur between the belt piece and the drive rollers adapted to move the belt piece along the rail thus making it difficult to guide a paper web smoothly, and intermittent guidance of the paper web which results from the slip will apply uneven tension to the paper web thus cutting the latter. Further, according to the prior art II, the paper web guiding member is a guide wheel which is provided with a drive means and which needs to be self-propelled along the rail, and therefore the whole size of the guide wheel and the rail becomes large and a large space is required for the running of the guide wheel. Therefore, the prior art II is not suitable for threading a paper web through a path including many turning points having a small radius of curvature as at turning bars or the like. Still further, according to the prior art III, the paper web guiding member is a chain, and some of the problems appendant to the above-mentioned prior arts I and II could be settled thereby. However, since the chain is allowed to flex or bend in two directions, but is not allowed to twist at all, it is impossible to thread a paper web by way of turning bars. Moreover, since the system for controlling the operation of the sprocket wheels to move the chain on the rail is complicated in construction, there is a large tendency for problems to occur such as difficulties in driving. Yet further, according to the prior art IV, the paper web guiding member is a flexible member having a cross-sectional shape so as to provide substantially the same magnitude of resistance to flexure in every direction, and problems appendant to the prior arts II and III could be solved thereby. However, since the above-mentioned flexible member has a circular or polygonal cross-sectional shape, and the area of contact between the flexible member and the friction wheel groups for moving the flexible member on the rail tends to become very small, a slip tends to occur between the flexible member and the drive friction wheels of the friction wheel groups for moving the flexible member on the rail, thus rendering it difficult to guide a paper web smoothly and bringing about the same disadvantage as that of the prior art I. In case the angle of the flexible member wound around the drive friction wheels is increased to prevent such difficulties from accurring, it becomes necessary to provide more than three friction wheels in each friction wheel group thus making the overall size of the apparatus large. Further, when threading of a paper web is conducted with a large angle kept between the drive friction wheels and the flexible member wound round it, the paper web is pulled out unavoidably in an extra amount corresponding to the large winding angle thus causing a slack in the paper web being threaded in an amount more than what is actually required. Further, the above-mentioned flexible member is allowed to flex in every direction with substantially the same resistance to flexure. When the flexible member is moved on and along the guide path in such a manner that it may flex in every direction, if the positional accuracy of the guide path is low or the guide path is deformed for some reason, there is a tendency of an ineffective tension being exerted on the paper web in other directions than those in which the paper web is allowed to flex, thus causing a tendency of the paper web being torn off by the tension.

SUMMARY OF THE INVENTION

The present invention has been devised in view of the above-mentioned circumstances in the prior art, and has for its object to provide a paper web threading apparatus for a rotary printing press, which occupies a minimum space required for the installation thereof and which enables automatic threading of a paper web to be conducted smoothly without applying any ineffective tension to the paper web which is being guided along all relevant paper web threading paths.

Another object of the present invention is to provide a paper web threading apparatus for a rotary printing press wherein the entire construction is simple, and hence the frequency of occurrence of problems is limited, and also maintenance and repairs thereof can be made easily.

To achieve the above-mentioned objects, according to one aspect of the present invention, there is provided a paper web threading apparatus for a printing press for threading a paper web through a paper web threading path extending from a paper web supply section through a printing section to a holding section to thereby conduct printing of the paper web, characterized in that it comprises a guide path provided along and laterally of the paper web threading path; a paper web guiding member which is comprised of a belt-shaped member having a plurality of projections, i.e., concave and convex portions formed regularly on at least one of the surfaces thereof or/and through-holes formed regularly therein so as to extend from one side thereof to the other, and also having a guided end engaging portion adapted to engage with or secure the guided end of the paper web; and a guiding member moving and driving means adapted to engage with the regularly formed projections, i.e., concave and convex portions or/and the regularly formed holes in the paper web guiding member so as to move the paper web guiding member along the guide path.

According to the aspect of the present invention having the above-mentioned configuration, the paper web guiding member which is comprised of a belt-shaped member, with which a paper web is appropriately engaged, is mounted on the guide path by engaging the projections, i.e., the regularly formed concave and convex portions or/and the regularly formed holes thereof with one of the guiding member moving and driving means. Subsequently, by actuating the guiding member moving and driving means, the paper web guiding member is moved along the guide path. After the leading end of the paper web guiding member has arrived at the position of the following guiding member moving and driving means mounted on the downstream side in the direction of advancement and is meshed with the latter so as to enable the paper web guiding member to be moved by the latter, the paper web guiding member is disengaged from the guiding member moving and driving means on the upstream side which has so far driven the guiding member. In other words, the leading end of the paper web guiding member is engaged with the following guiding member moving and driving means mounted on the downstream side, before it is disengaged from the guiding member moving and driving means mounted on the upstream side. Further, the engagement and disengagement of the paper web guiding member with and from the following guiding member moving and driving means mounted in turn on the down-stream side are repeatedly made to ensure that the paper web guiding member is moved on and along the guide path.

Since the paper web guiding member is a flexible, belt-shaped member, when a paper web is threaded by way of turning bars, the paper web guiding member is allowed to flex to substantially the same degree as that of the paper web to thereby ensure that the threading of the paper web is conducted smoothly. Further, since the paper web guiding member, which is comprised of a belt-shaped member, is not allowed to flex to a degree more than the allowable flexture of the paper web, there is no possibility of the paper web being subjected to ineffective tension in such directions as it is not allowed to flex. The above-mentioned and other objects, aspects and advantages of the present invention will become apparent to those skilled in the art by making reference to the following description and the accompanying drawings in which preferred embodiments incorporating the principles of the present invention are shown by way of example only.

DETAILED DESCRIPTION OF PREFERRED EMBODIMENTS

The present invention will now be described in detail below by way of example only with reference to the accompanying drawings.

Figure 7:
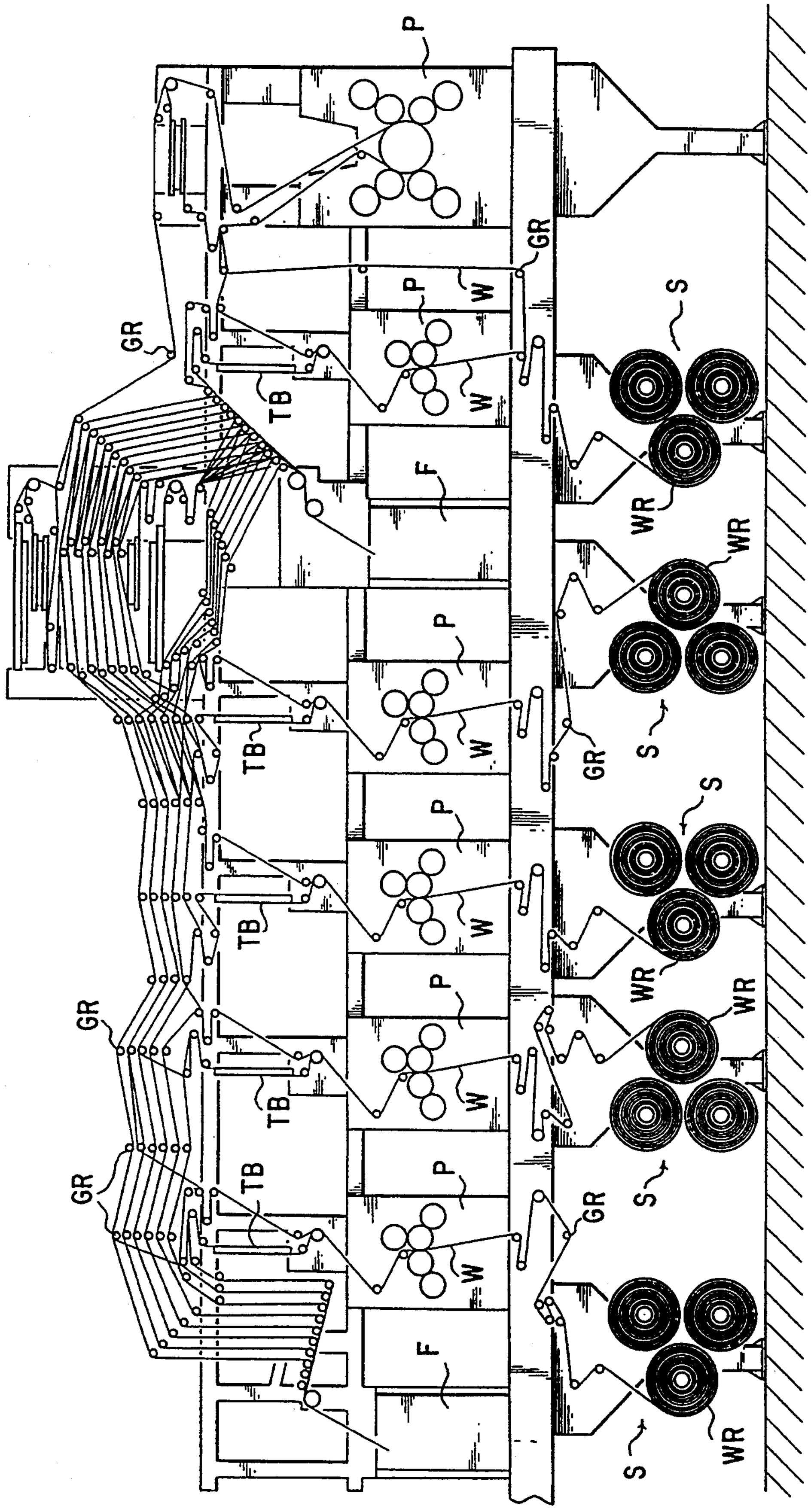
FIG. 7 is a schematic front view showing one example of a printing press on which the embodiment of the present invention can be mounted.

As schematically shown in FIG. 7, the present invention provides a paper web threading apparatus useful in particular for drawing out a paper web W from a paper web roll WR installed at each paper supply section S, selecting appropriately a predetermined paper threading path extending from a paper web supply section S through a printing section P to a folding section F for obtaining a desired printed matter and guiding the paper web W along the predetermined path, which is adapted for use in a printing press comprising one or a plurality of paper web supply section(s) S, printing section(s) P and folding section(s) F associated with one another, and having a predetermined paper web threading path extending from the paper web supply section(s) S through the printing section(s) P to the folding section(s) F, the predetermined paper web threading path being defined by a plurality of guide rollers GR and turning bars TB, etc. and branched by them on the way into several parts. The arrangement of the paper web threading apparatus is as shown, for example, in FIGS. 1 to 6.

Stating in brief, a guide path 1 for guiding a paper web guiding member 2, which will be described hereinbelow, along the inside of a frame (not shown) of a printing press and laterally of a paper web threading path, defined by a plurality of guide rollers GR and turning bars TB, is fixedly secured to the above-mentioned frame through appropriate brackets (not shown). This guide path 1 has a groove 11 formed therein to enable the paper web guiding member 2 mounted therein to maintain its engagement with a paper web W, which is engaged therewith and guided along the paper web threading path, during paper web threading operation. Further, when the paper web threading path is branched by desired printed matters, the guide path 1 is branched into sections whose number corresponds to that of the branched sections of the path 1, and at the branched position there is provided a guide path change-over means 3 for selectively changing or switching over a plurality of downstream guide paths 1 which extend continuously with a single or a plurality of upstream guide paths 1.

Further, in association with the guide path 1, and at positions facing on the running zone of the paper web guiding member 2 along the guide path 1 and at regular intervals shorter than the length of the guiding member 2, there are provided driving members 41 each having regularly defined projections on one side thereof, and driver means 42 adapted to drive the respective driving member 41, thus forming guiding member moving and driving means 4 adapted to move the above-mentioned paper web guiding member 2 on and along the guide path 1. The driver means 42 are appropriately fixedly secured either to the frame (not shown) of the printing press or to the guide path 1.

The above-mentioned paper web guiding member 2 is comprised of a belt-shaped member of a predetermined length which can be mounted on the above-mentioned guide path 1 and which is deformable in accordance with the flexure of the guide path 1 and has a plurality of projection, i.e., concave portions 21 and/or convex portions 22 formed regularly on at least one of the flat surfaces thereof (refer to FIG. 3A), or regularly formed through-holes 23, 24 extending from one of the flat surfaces thereof to the other. (Refer to FIGS. 3B and 3C). Further, the paper web guiding member 2 has a guided end engaging portion 25 adapted to engage with or secure the guided end WE of a paper web W. Further, the guided end engaging portion 25 may be of a configuration projecting widthwise of the paper web guiding member 2 as shown or may be in the form of a slit (not shown) defined in the guiding member 2.

While, on the upstream side of the above-mentioned printing press in the vicinity of turning bars TB, there is provided a paper web engaging and delivery section 5 for engaging the paper web W with a further paper web guiding member 2', as occasion demands, and a guide path 1' is provided which includes the section 5 as the upstream component part thereof.

The operation of the apparatus which is configured as mentioned above will now be described below.

In the first place, the paper web guiding member 2 is mounted on the guide path 1, the projections, i.e., the concave and convex portions or the holes of the paper web guiding member 2 are engaged with the projections of the driving member 41 of the guiding member moving and driving means 4 on the most upstream side. Upon mounting the paper web guiding member 2 on the guide path 1, the guided end engaging portion 25 thereof is allowed to project through a continuous groove 11 formed in the guide path 1.

In the next place, the end of the paper web W, drawn out from the paper web roll WR, is formed in a pointed knife configuration with its leading end located near the guide path 1, and the leading end portion is folded appropriately so as to project it towards the guide path 1 thereby forming a guided end WE, which is then secured to the guided end engaging portion 25 of the paper web guiding member 2 by means of an adhesive tape or the like.

Subsequently, the guide path change-over means 3, installed at each of branched position of the guide path 1, is actuated for switch-over so as to correspond to a desired paper web threading path which is input or designated by inputting the desired paper web threading path in a controlling section 04 by means of a paper web threading path designating and inputting section 02 in a paper web threading apparatus controlling means 01 (refer to FIG. 6) provided, for example, in a printing press controlling section (not shown), and then turning a switch 03 on for actuating the paper web threading apparatus. After that, the driver means 42 at all of the member moving and driving means 4 are actuated to rotate the driving members 41 all together. As a result, the paper web guiding member 2 which is engaged or meshing with the driving member 41 on the most upstream side is moved along the guide path 1 until the leading end of the paper web guiding member 2 reaches the position of the driving member 41 of the following guiding member moving and driving means 4 on the downstream side and is engaged with the driving member 41. Then, the paper web guiding member 2 is moved by the rotation of the driving member 41 on the most upstream side and also by the rotation of the following driving member 41 on the downstream side. When the entire predetermined length of the paper web guiding member 2 has passed through the driving member 41 on the most upstream side, it is moved downstream only by following driving member 41 on the downstream side. Thereafter, the paper web guiding member 2 is engaged with the driving members located further downstream side one after another so as to guide the paper web W into a designated paper web threading path.

Figure 1:
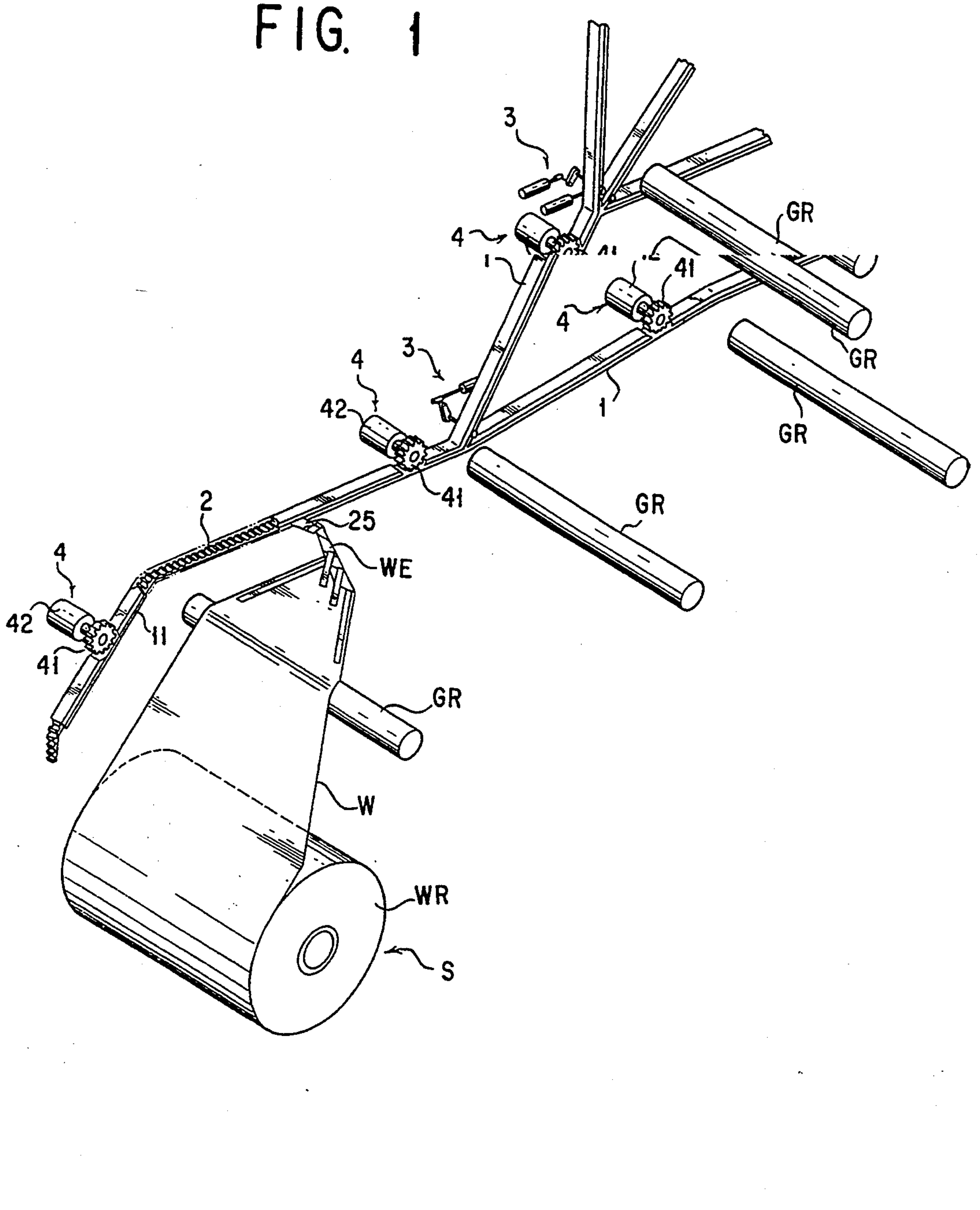
FIGS. 1 and 2 are perspective views showing typical schematic arrangements of one embodiment of the present invention at different sections, respectively.
Figure 2:
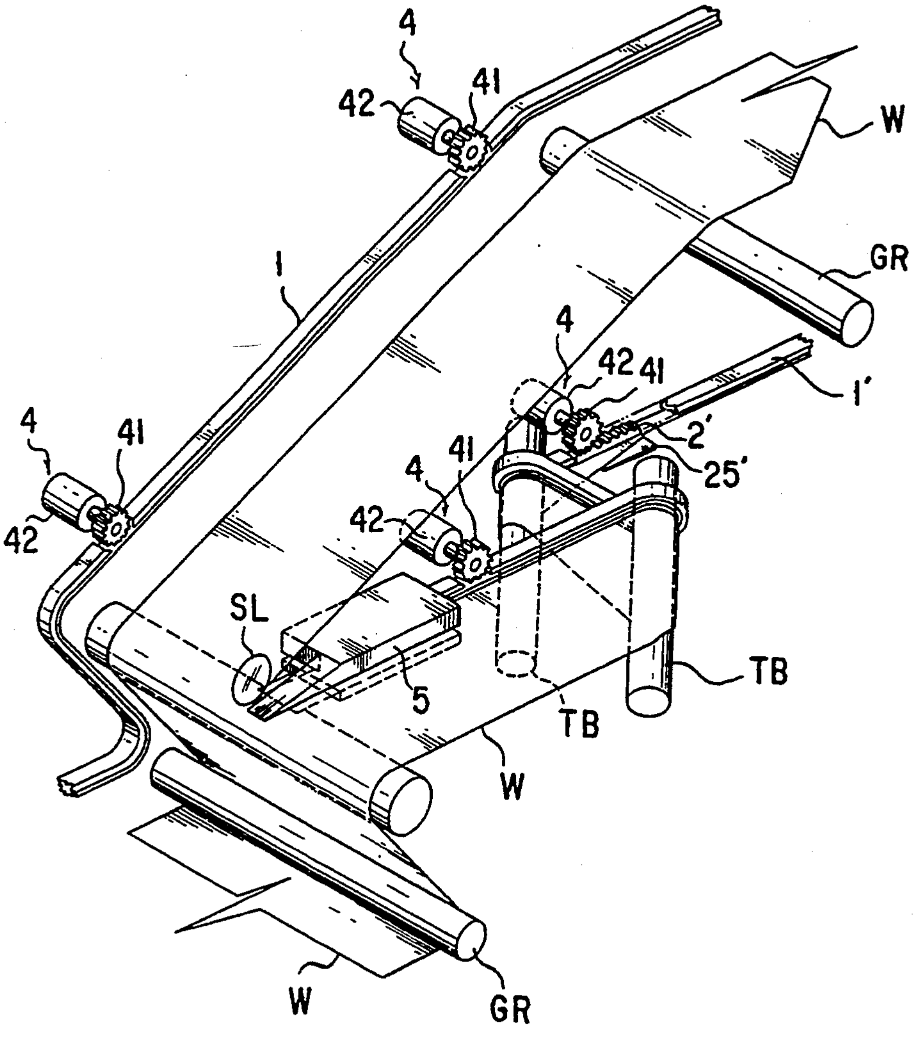
Figure 3A:
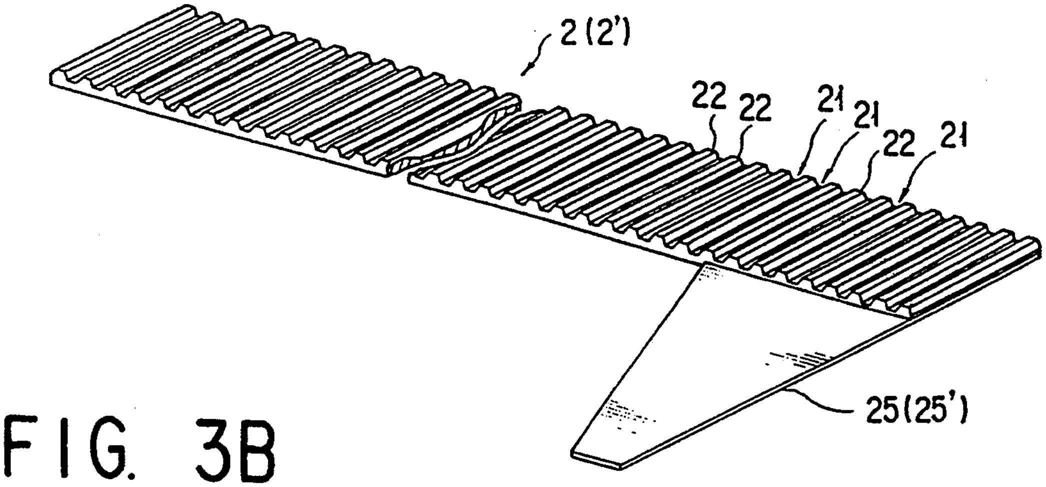
FIGS. 3A to 3C are perspective views showing three embodiments, respectively, of the paper web guiding members used in the embodiment of the present invention shown in FIGS. 1 and 2.
Figure 3B:
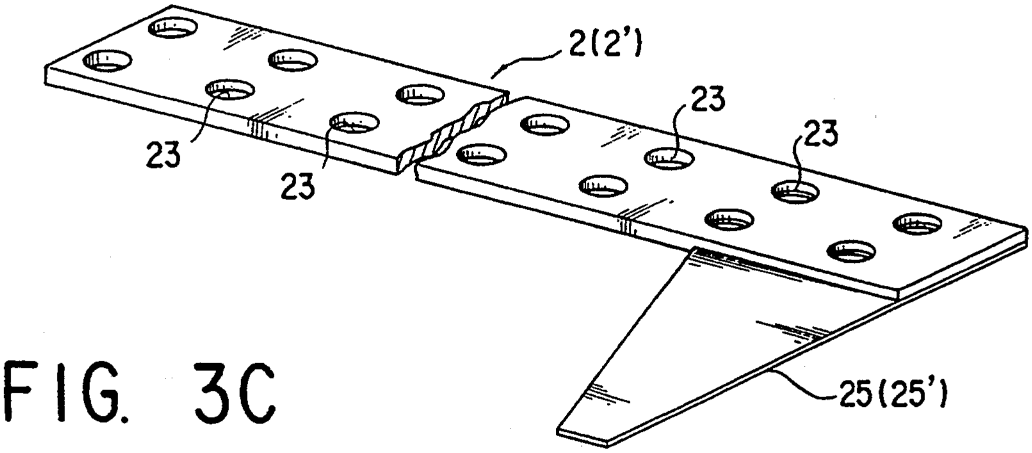
Figure 3C:
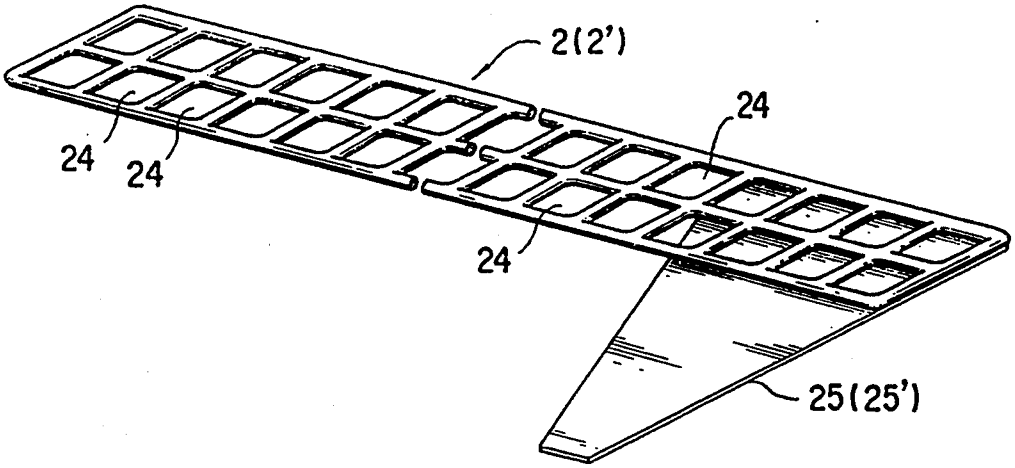
Figure 4A:
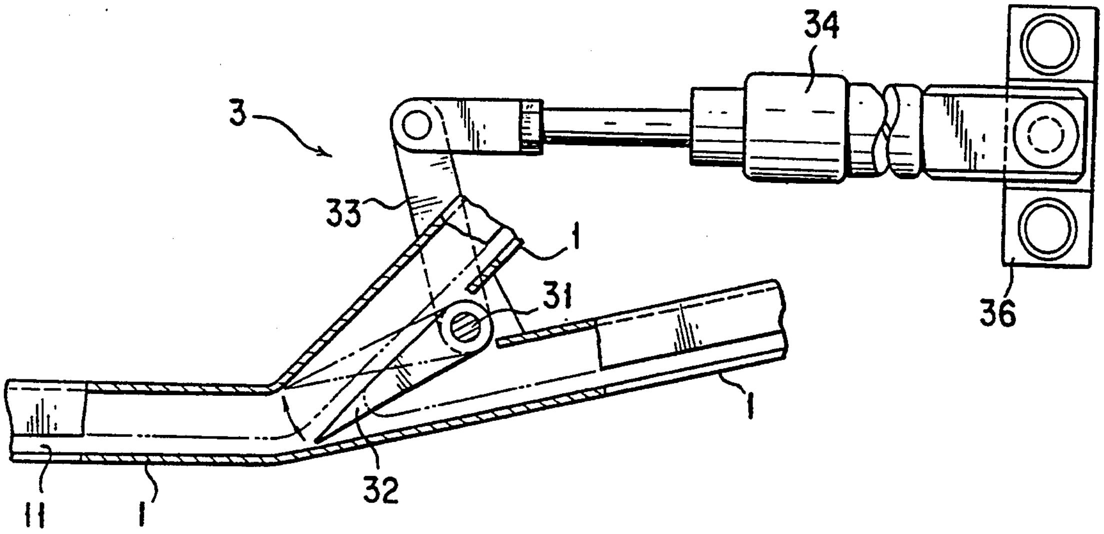
FIGS. 4A and 4B are front views showing schematically embodiments of the guide change-over means according to the present invention used at different sections, respectively.
Figure 4B:
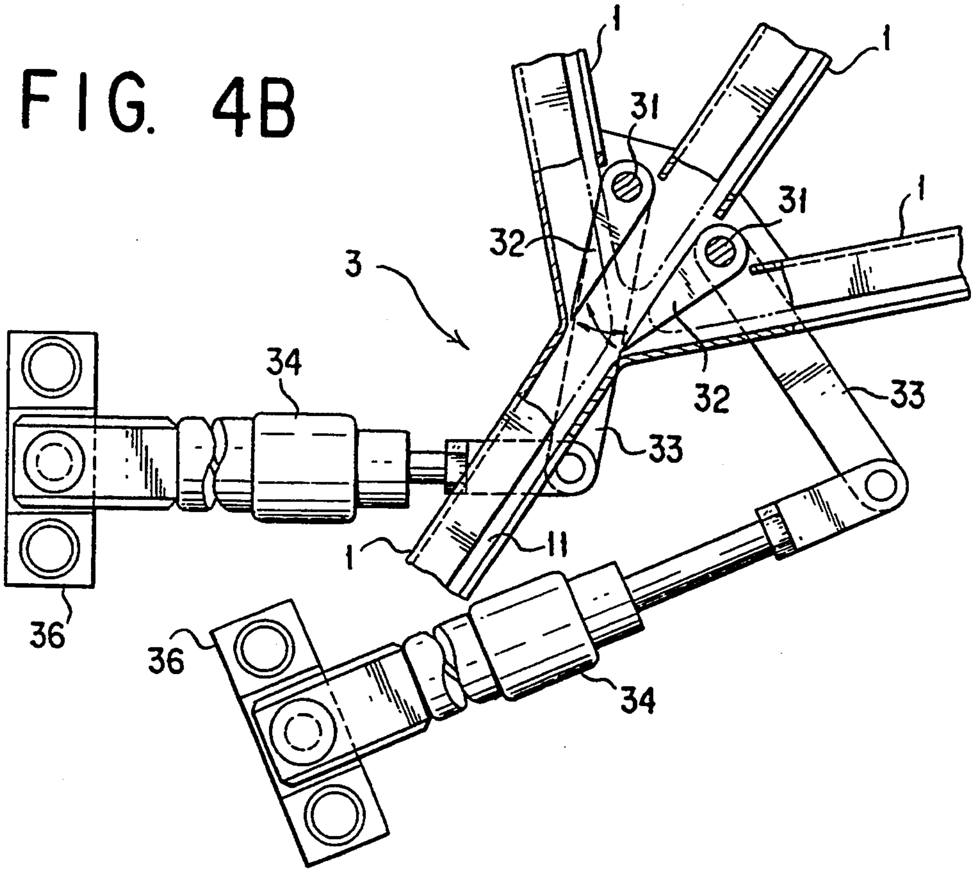
Figure 5A:
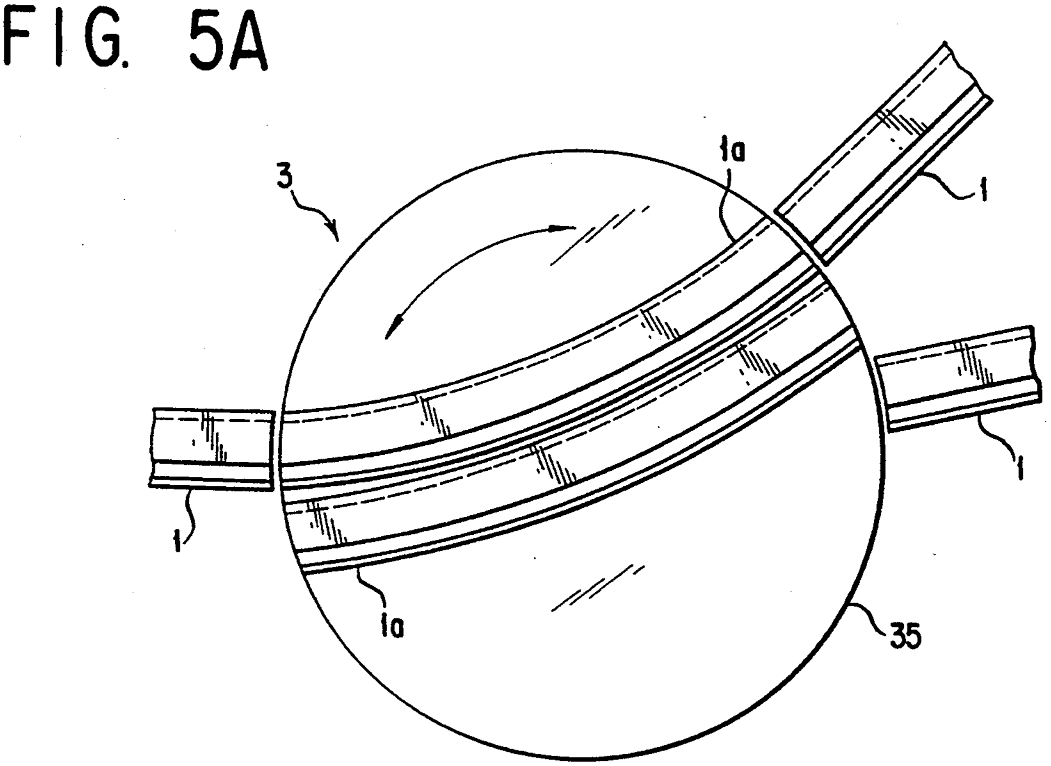
FIGS. 5A and 5B are front views showing schematically modified embodiments of the guide change-over means according to the present invention used at different sections, respectively.
Figure 5B:
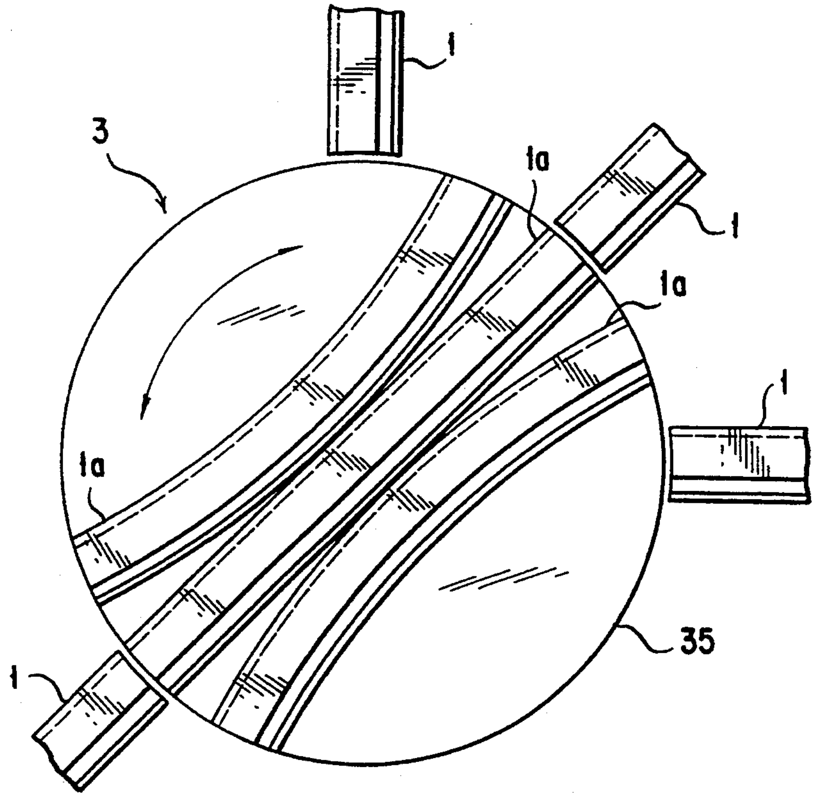
Figure 6:
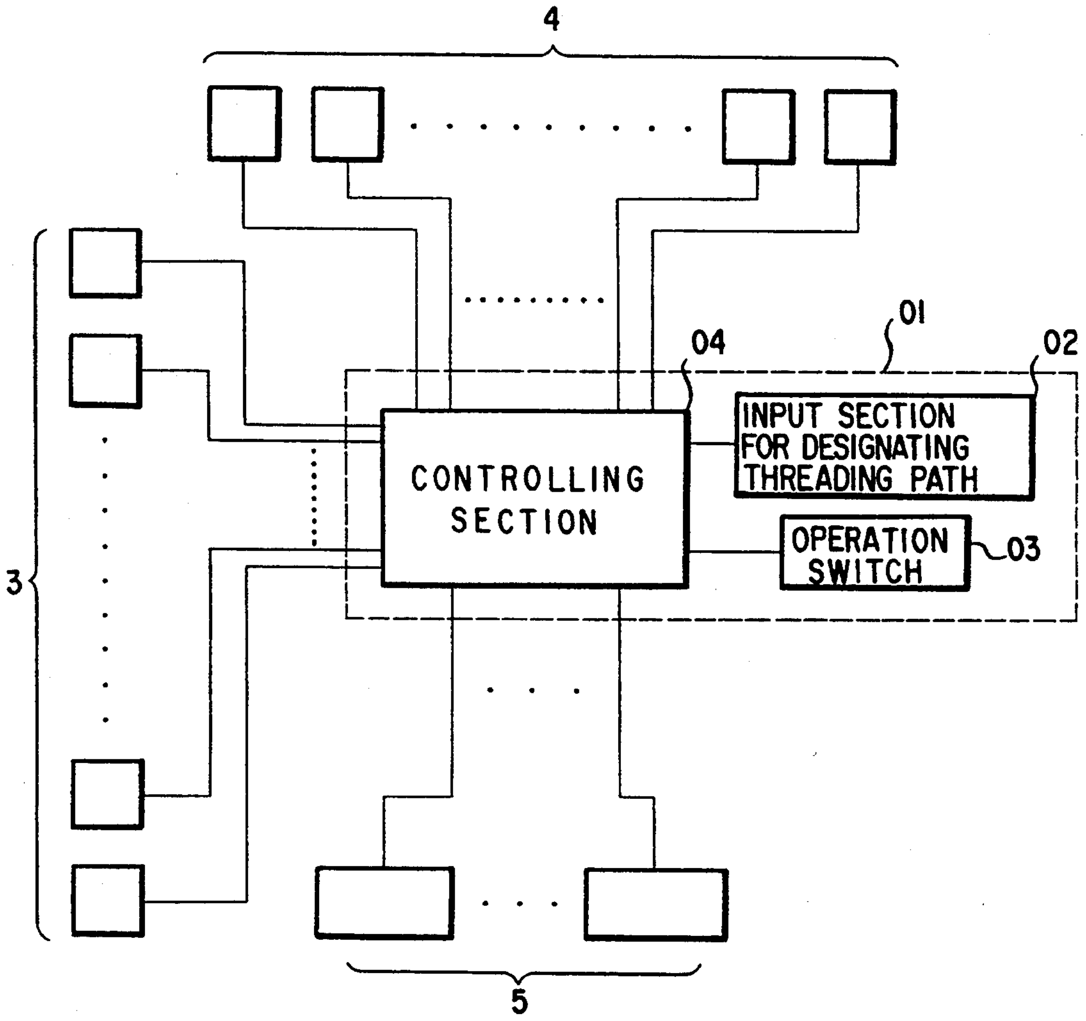
FIG. 6 is a block diagram showing one embodiment of operational controlling system used in the embodiment of the present invention.

Further, the above-mentioned guide path change-over means 3 is constructed, as shown, for example, in FIGS. 4A and 4B, such that a guide plate 32 fixedly secured to a support shaft 31 mounted in such a way as to turn freely can be turned by a hydraulic cylinder 34 through an arm 33 fixedly secured to the end of the support shaft 31 so as to connect the upstream guide path 1 to one of the downstream guide paths 1, 1 and block other downstream guide paths 1, 1, or alternatively, it is constructed, as shown in FIGS. 5A and 5B, such that at each of the branched position a turning plate 35 is provided which has intermediate guide paths 1*a*, 1*a* formed therein to enable the guide path 1 on the upstream side to be connected separately to individual one of the branched guide paths 1, 1 on the downstream side, and the turning plate 35 may be turned by means of an appropriate driver means (such as, for example, a stepping motor or a hydraulic actuator, both of which are not shown) so as to connect the guide path 1 on the upstream side to individual one of the branched guide paths 1, 1 on the downstream side. Further, hydraulic cylinder 34 of the above-mentioned guide path change-over means 3 is mounted through a bracket 36 on the frame, not shown, of the printing press in such a way that it may be turned freely, and also the turning plate 35 and the driver means, not shown, are mounted either on the frame, not shown, of the printing press or on the guide path 1.

In case the paper web W, which is guided along a paper web threading path, is guided by biasing turning bars TB (Refer to FIG. 2) adapted to bias one of two widthwise slit portions of the paper web W towards the remaining one so as to allow the former one to underlie the latter one, the paper web W is slit by a slitter SL widthwise into two left and right hand portions on the upstream side of the biasing turning bars TB, and one of the two slit portions is guided into the paper web engaging and delivery section 5 and engaged with a guided end engaging portion 25′ of a paper web guiding member 2′, and then delivered onto a guide path 1′. When the paper web guiding member 2′ is moved along the guide path 1′ by guiding member moving and driving means 4, 4 provided on the guide path 1′ the above-mentioned one of the two slit portions of the paper web W is guided along a paper web threading path which extends by way of the biasing turning bars TB. The remaining one of the two slit portions is guided as it is by the paper web guiding member 2 which is moved along the guide path 1. Further, while the above-mentioned one of the two slit portions of paper web W is engaged by the paper web engaging and delivery section 5 with the guided end engaging portion 25′ of the paper web guiding member 2′ the operation of all the guiding member moving and driving means 4, 4 may be stopped, and the guiding of the two slit portions of the paper web W into their respective paper web threading paths may be stopped temporarily. Further, as for the mechanism for engaging the above-mentioned one of the two slit portions of the paper web W with the guided end engaging portion 25′ of the paper web guiding member 2′ the mechanism (not shown) which is used in guiding such a paper web by a paper web threading apparatus, which uses a conventional paper tensioning belt, to a turning bar may be applied. The present invention covers design modifications which do not constitutes departures from the spirit or the scope of the appended claims. Stating more specifically, the present invention may be constructed, for example, such that the guiding member moving and driving means 4, 4 may be actuated in turn in advance of movements of the paper web guiding members 2 and 2′, or such that each of the guide path change-over means 3 can be individually actuated for change-over, or such that the driver means 42 can be used commonly for the guiding member moving and driving means 4, 4 and a plurality of driving members 41, 41 can be driven by a single driver means 42, or alternatively such that the driving members 41 are arranged in the form of endless belts (not shown) extending between a plurality of shafts along the guide paths 1, 1′ so that they can be engaged with the paper web guiding members 2, 2′.

It is to be understood that the foregoing description is merely illustrative of preferred embodiments of the present invention, and that the scope of the present invention is not to be limited thereto, but is to be determined by the scope of the appended claims.

What is claimed is:

1. A paper web threading apparatus for a rotary printing press for threading a paper web through a paper web threading path extending from a paper web supply section through a printing section and to and through a paper folding section therein for conducting printing on the paper web, said paper web threading apparatus comprising:

a guide path provided along and laterally of the paper web threading path, said guide path being branched into a plurality of paths at a plurality of spaced branch positions of said paper web along said threading path and to and through said paper folding section;

a paper web guiding member comprising a continuously flexible, deformable belt-shaped member of a predetermined length which is flexible in a lateral direction, said paper web guiding member having a guided and engaging portion for engagement with and securing a guided end of said paper web;

a plurality of guiding member moving and driving means for moving the paper web guiding member along the guide path, said plurality of guiding member moving and driving means provided along said guide path and at regular intervals shorter than said predetermined length of said paper web guiding member, each of said guiding member moving and driving means including a driver means and a driving member driven by the driver means and meshing with the paper web guiding member; and a plurality of guide path change-over means, provided at each of said spaced branched positions, for selectively changing direction of advancement of said paper web guiding member to a direction of each of said spaced branch positions and at said paper folding section for changing direction of said paper web guide members through said paper folding section as said paper web is folded, wherein said plurality of guide path change-over means includes a plurality of turning bars for changing the direction of advancement of said paper web guiding member in a lateral direction.

2. A paper web threading apparatus as claimed in claim 1, wherein said paper web guiding member has a plurality of projections formed in transverse rows at regular intervals with one another on at least one of the surfaces thereof.

3. A paper web threading apparatus as claimed in claim 1, wherein said paper web guiding member has a plurality of through-holes formed therein so as to extend from one side thereof to the other and arranged longitudinally at regular intervals with one another.

4. A paper web threading apparatus as claimed in claim 1 further comprising a slitter for slitting said paper web into two portions, each portion branched into different branch paths.

* * * * *